United States Patent
Chien et al.

(10) Patent No.: US 8,134,527 B2
(45) Date of Patent: Mar. 13, 2012

(54) TOUCH SENSING DISPLAY PANEL, TOUCH SENSING COLOR FILTER AND FABRICATING METHOD THEREOF

(75) Inventors: Yu-Feng Chien, Taipei County (TW); Tun-Chun Yang, Taipei (TW); Seok-Lyul Lee, Hsinchu (TW); Chih-Jen Hu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 636 days.

(21) Appl. No.: 12/344,594

(22) Filed: Dec. 29, 2008

(65) Prior Publication Data

US 2009/0322702 A1 Dec. 31, 2009

(30) Foreign Application Priority Data

Jun. 25, 2008 (TW) .............................. 97123747 A (51) Int. Cl.
*G09G 3/36* (2006.01)
(52) U.S. Cl. .......................................... 345/88; 345/690
(58) Field of Classification Search .................. None
See application file for complete search history.

(56) References Cited

U.S. PATENT DOCUMENTS

| 5,962,906 | A | * | 10/1999 | Liu ............................... 257/432 |
| 6,057,903 | A | | 5/2000 | Colgan et al. |
| 6,483,498 | B1 | * | 11/2002 | Colgan et al. ................. 345/173 |
| 2008/0239214 | A1 | * | 10/2008 | Lee et al. ...................... 349/106 |
| 2009/0102814 | A1 | * | 4/2009 | Lin et al. ....................... 345/174 |
| 2009/0322702 | A1 | * | 12/2009 | Chien et al. ................... 345/174 |

* cited by examiner

*Primary Examiner* — Peter Vincent Agustin
(74) *Attorney, Agent, or Firm* — Jianq Chyun IP Office (57) ABSTRACT

A touch sensing color filter including a substrate, a black matrix, a color filter layer and a second sensing electrode layer is provided. The black matrix is disposed on the substrate to define a plurality of sub-pixel areas. The black matrix includes a first sensing electrode layer, and the first sensing electrode layer has a plurality of openings corresponding to the sub-pixel areas. The color filter layer includes a plurality of color filter units disposed in the sub-pixel areas respectively. The second sensing electrode layer is disposed on the substrate, and the second sensing electrode layer includes a plurality of sub patterns corresponding to the sub-pixel areas. A method for fabricating the touch sensing color filter and a display panel using the same are further provided.

21 Claims, 10 Drawing Sheets

TOUCH SENSING DISPLAY PANEL, TOUCH SENSING COLOR FILTER AND FABRICATING METHOD THEREOF

CROSS-REFERENCE TO RELATED APPLICATION

This application claims the priority benefit of Taiwan application serial no. 97123747, filed on Jun. 25, 2008. The entirety of the above-mentioned patent application is hereby incorporated by reference herein and made a part of specification.

BACKGROUND OF THE INVENTION

1. Field of the Invention

The present invention relates to a display panel, a color filter, and fabricating methods thereof. More particularly, the present invention relates to a touch sensing display panel, a touch sensing color filter, and fabricating methods thereof.

2. Description of Related Art

As information technology, wireless mobile communication, and information electric appliances rapidly develop in the recent years, the input devices for a great many information electronic products have been changed from conventional keyboards and mice to touch panels for the purposes of convenience, miniaturization, and being user-friendly. Especially, a touch sensing display device has become the most popular product among all.

Currently, touch panels can be roughly categorized as capacitance type, resistance type, and photosensitive type, wherein the capacitance type touch panel is popular among all display panel products. In addition, touch panels can be categorized as attached type and integrated type according to their structures and constitution, wherein an integrated type touch panel can be integrated into the fabrication of the whole panel (for instance, the fabrication of a color filter) to decrease the thickness of the product in compliance with the trend of miniaturization.

In view of structure, integrated capacitance type touch panels can be further classified into single-side design, which are formed on the same plane of the glass substrate, and double-side design, which are formed on different planes of the glass substrates. The double-side design is easier to be fabricated, but the thickness and resolution thereof are limited. Although the structure of the single-side design is simpler than that of the double-side design, the single-side design still has the problems of complicated fabricating process and limited resolution.

For instance, a conventional single-side touch sensing color filter generally includes a substrate, a lower electrode layer, a first dielectric layer, a color filter layer, a second dielectric layer, and a common electrode layer. The lower electrode layer is disposed on the substrate as a black matrix to define a plurality of sub-pixel areas. The lower electrode layer usually comprises a plurality of X electrodes and a plurality of Y electrodes arranged as an array, wherein the X electrodes are connected with one another to form a series of X electrodes. The first dielectric layer is disposed on the substrate to cover the X electrodes and the Y electrodes. Moreover, a plurality of bridge lines is disposed on the first dielectric layer. The bridge lines are serially connected with the Y electrodes below through the through holes in the first dielectric layer, so as to form a series of Y electrodes interlacing the serially connected X electrodes. The color filter layer comprises a plurality of color filter units respectively disposed in the sub-pixel areas P1. The second dielectric layer covers the color filter layer and the bridge lines, and the common electrode layer is disposed on the second dielectric layer.

To conclude, during the fabrication of the conventional touch sensing color filter, one more photo-mask process needs to be performed so as to form the through holes in the first dielectric layer. Hence, the fabrication is more complicated, and the process yield thereof can not be assured. Further, the X electrodes and Y electrodes of the touch sensing color filter are usually designed to be on the same plane, namely single-side design (opposite to double-side design, in which the X electrodes and Y electrodes are formed on different planes). As a consequence, the arrangement and number of the electrodes are limited easily, which results in that the touch sensing resolution thereof can not be further improved.

In other words, current touch panels mostly have the shortcomings of complicated fabricating process and limited resolution. For this reason, how to improve the fabricating process and enhance touch sensing resolution has become the main focus of developing touch panels.

SUMMARY OF THE INVENTION

The present invention provides a touch sensing color filter which has better touch sensing resolution and touch sensing sensitivity.

The present invention further provides a fabricating method of the touch sensing color filter, which has a simplified fabricating process and a better process yield.

The present invention further provides a touch sensing display panel which uses the touch sensing color filter for improving touch sensing resolution and touch sensing sensitivity.

The present invention provides a touch sensing color filter which comprises a substrate, a black matrix, a color filter layer, and a second sensing electrode layer. The black matrix is disposed on the substrate to define a plurality of sub-pixel areas. In addition, the black matrix comprises a first sensing electrode layer having a plurality of openings corresponding to the sub-pixel areas. The color filter layer comprises a plurality of color filter units disposed in the sub-pixel areas respectively. The second sensing electrode layer is disposed on the substrate and comprises a plurality of sub patterns corresponding to the sub-pixel areas respectively.

According to an embodiment of the present invention, the sub patterns of the second sensing electrode layer are respectively disposed on the color filter units of the color filter layer.

According to an embodiment of the present invention, the touch sensing color filter further comprises a first dielectric layer. The first dielectric layer covers the color filter layer and the black matrix, and the second sensing electrode layer is disposed on the first dielectric layer.

According to an embodiment of the present invention, the touch sensing color filter further comprises a second dielectric layer. The second dielectric layer is disposed between the black matrix and the substrate, and the second sensing electrode layer is disposed between the second dielectric layer and the substrate.

According to an embodiment of the present invention, the touch sensing color filter further comprises a third dielectric layer. The third dielectric layer covers the black matrix, the color filter layer, and the second sensing electrode layer.

According to an embodiment of the present invention, the touch sensing color filter further comprises a common electrode layer. The common electrode layer is disposed on the third dielectric layer.

According to an embodiment of the present invention, a material of the first sensing electrode layer is an opaque metal.

According to an embodiment of the present invention, the black matrix further comprises a black resin layer. The black resin layer overlaps the first sensing electrode layer.

According to an embodiment of the present invention, a material of the second sensing electrode layer is a transparent conductor.

According to an embodiment of the present invention, the black matrix further comprises an anti-reflective layer.

The anti-reflective layer is disposed between the first sensing electrode layer and the substrate.

According to an embodiment of the present invention, the first sensing electrode layer is an X electrode. The first sensing electrode layer comprises a plurality of individual sensing blocks, wherein each sensing block corresponds to a plurality of sub-pixel areas.

According to an embodiment of the present invention, the second sensing electrode layer is a Y electrode. The sub patterns of the second sensing electrode layer are divided into a plurality of groups corresponding to the sensing blocks, and the groups of the sub patterns are serially connected with one another.

The present invention further provides a fabricating method of a touch sensing color filter. First, a substrate is provided. Next, a black matrix is formed on the substrate to define a plurality of sub-pixel areas, wherein a method for forming the black matrix is to form a first sensing electrode layer and then form a plurality of openings corresponding to the sub-pixel areas in the first sensing electrode layer. Thereafter, a plurality of color filter units is formed in the sub-pixel areas. Then, a second sensing electrode layer is formed on the substrate, wherein the second sensing electrode layer comprises a plurality of sub patterns corresponding to the sub-pixel areas respectively.

According to an embodiment of the present invention, the fabricating method of the touch sensing color filter may form the black matrix on the substrate first. Then, after the color filter units are formed, the sub patterns of the second sensing electrode layer are formed on the color filter units.

According to an embodiment of the present invention, the fabricating method of the touch sensing color filter may form the black matrix and the color filter units. Then, a first dielectric layer is formed to cover the color filter units and the black matrix. Thereafter, the second sensing electrode layer is formed on the first dielectric layer.

According to an embodiment of the present invention, the fabricating method of the touch sensing color filter may form the second sensing electrode layer on the substrate first. After the second sensing electrode layer is formed, a second dielectric layer is formed to cover the second sensing electrode layer. Thereafter, the black matrix and the color filter units are formed.

According to an embodiment of the present invention, the fabricating method of the color filter further comprises forming a third dielectric layer to cover the black matrix, the color filter units, and the second sensing electrode layer.

According to an embodiment of the present invention, the fabricating method of the color filter further comprises forming a common electrode layer on the third dielectric layer.

According to an embodiment of the present invention, the method for forming the black matrix further comprises forming a black resin layer overlapping the first sensing electrode layer.

According to an embodiment of the present invention, the method for forming the black matrix further comprises forming an anti-reflective layer between the first sensing electrode layer and the substrate.

The present invention further provides a touch sensing display panel which comprises a color filter, a display array substrate, and a liquid crystal layer. The color filter comprises the black matrix, the cooler filter layer, and the second sensing electrode layer. The black matrix is disposed on the substrate to define a plurality of sub-pixel areas. The black matrix comprises the first sensing electrode layer which has a plurality of openings corresponding to the sub-pixel areas. The color filter layer comprises a plurality of color filter units. The color filter units are disposed in the sub-pixel areas respectively. The second sensing electrode layer is disposed on the substrate. The second sensing electrode layer comprises a plurality of sub patterns, wherein the sub patterns correspond to the sub-pixel areas respectively. The liquid crystal layer is disposed between the color filter and the display array substrate.

To conclude, the present invention integrates the existing fabricating methods of color filters to provide a simplified process for fabricating a color filter with higher process yield. Moreover, according to the present invention, one individual sensing electrode, either an X electrode or a Y electrode, is formed to correspond to sub-pixel areas. Hence, the sensing resolution is effectively improved.

To make the above features and advantages of the present invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
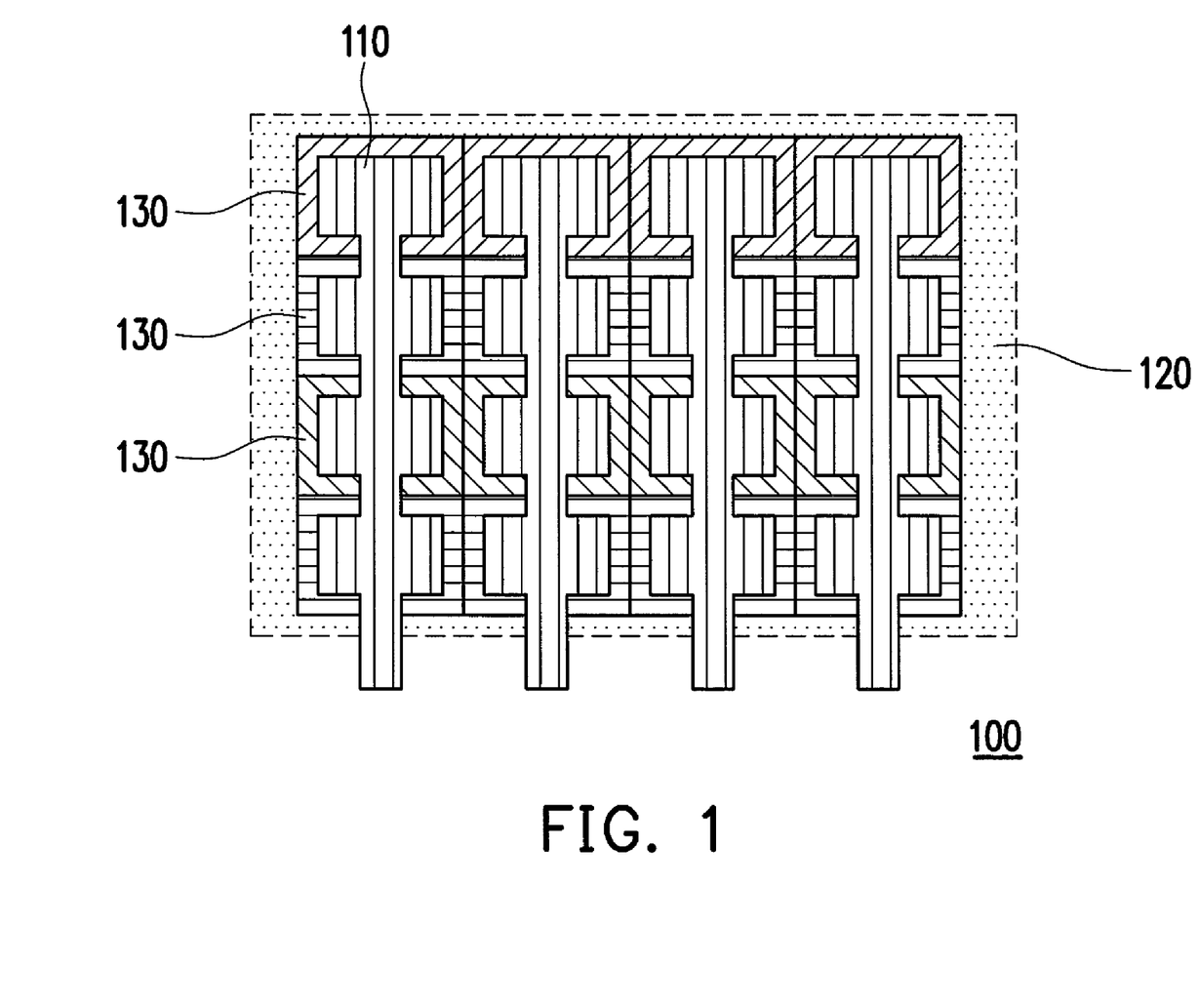
FIG. 1 illustrates a portion of the sensing blocks of a touch sensing color filter according to the present invention.
Figure 1A:
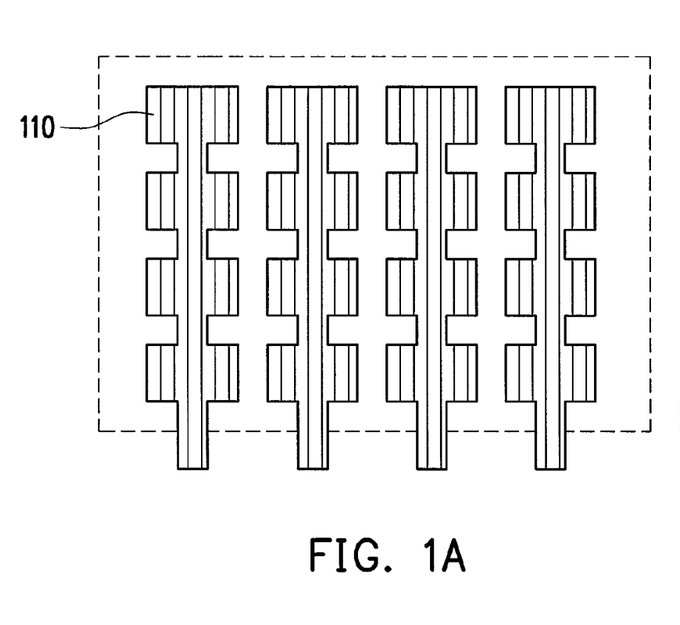
FIGS. 1A and 1B respectively illustrate the X electrode and the Y electrode of the sensing unit as shown in FIG. 1.
Figure 1B:
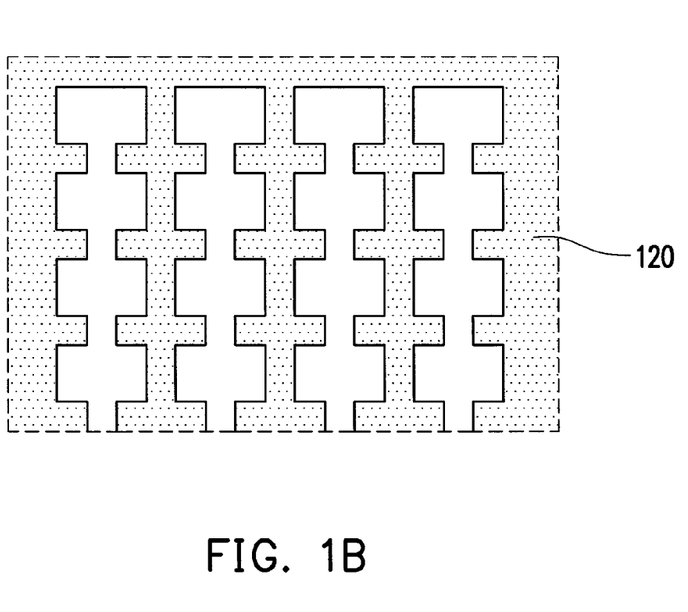

FIG. 1 illustrates a portion of the sensing blocks of a touch sensing color filter according to the present invention, and FIGS. 1A and 1B respectively illustrate an X electrode and a Y electrode of the sensing unit as shown in FIG. 1. Referring to FIGS. 1, 1A, and 1B, a sensing block 100 comprises an X electrode 110, a Y electrode 120, and a color filter layer, wherein the X electrode 110 is, for example, a transparent electrode formed of indium tin oxide (ITO), indium zinc oxide (IZO), indium tin zinc oxide (ITZO), hafnium oxide, zinc oxide, aluminum oxide, aluminum tin oxide (ATO), aluminum zinc oxide (AZO), cadmium tin oxide (CTO), or cadmium zinc oxide (CZO), and the Y electrode 120 is, for example, a black matrix including a first sensing electrode layer. The first sensing electrode layer is formed of opaque metal, such as chromium, molybdenum, aluminum, titanium, oxides thereof, or a conductive layer with a black resin, or a combination thereof.

In the sensing block 100, the color filter layer 130 is disposed on the Y electrode 120 and the X electrode 110 is disposed on the color filter layer 130. However, according to the user's requirement and design, the layers of the X electrode 110 and the Y electrode 120 may be switched to form another type of sensing block. Moreover, the layers between the X electrode 110 and the Y electrode 120 may be exchanged or disposed differently (for example, the Y electrode—the color filter layer—a dielectric layer—the X electrode) to form several types of sensing blocks. Consequently, different types of touch sensing color filters are formed by different types of sensing blocks. Several embodiments are described in the following paragraphs.

First Embodiment

Figure 2A:
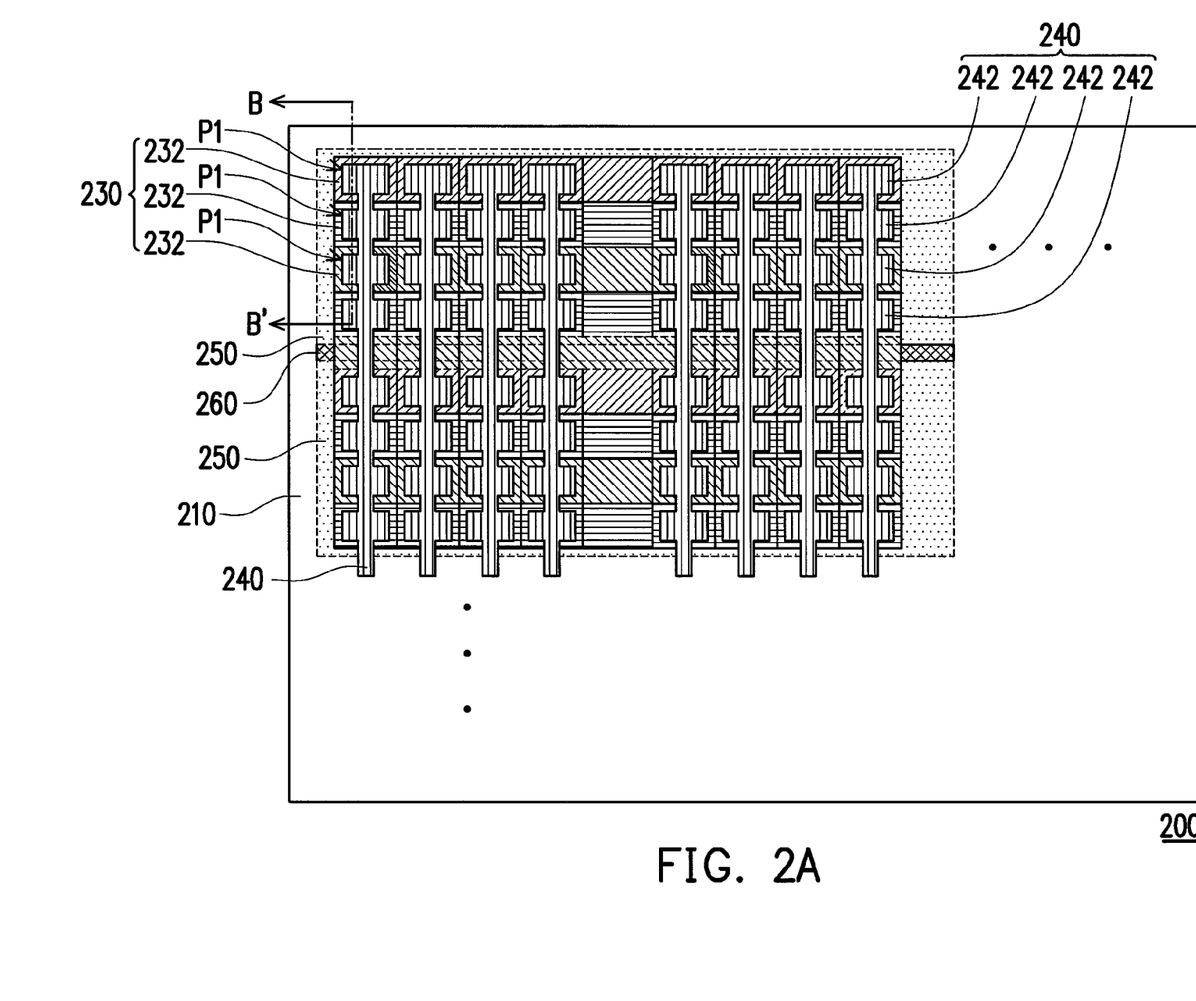
FIG. 2A illustrates a top view of a touch sensing color filter according to the first embodiment of the present invention.
Figure 2B:
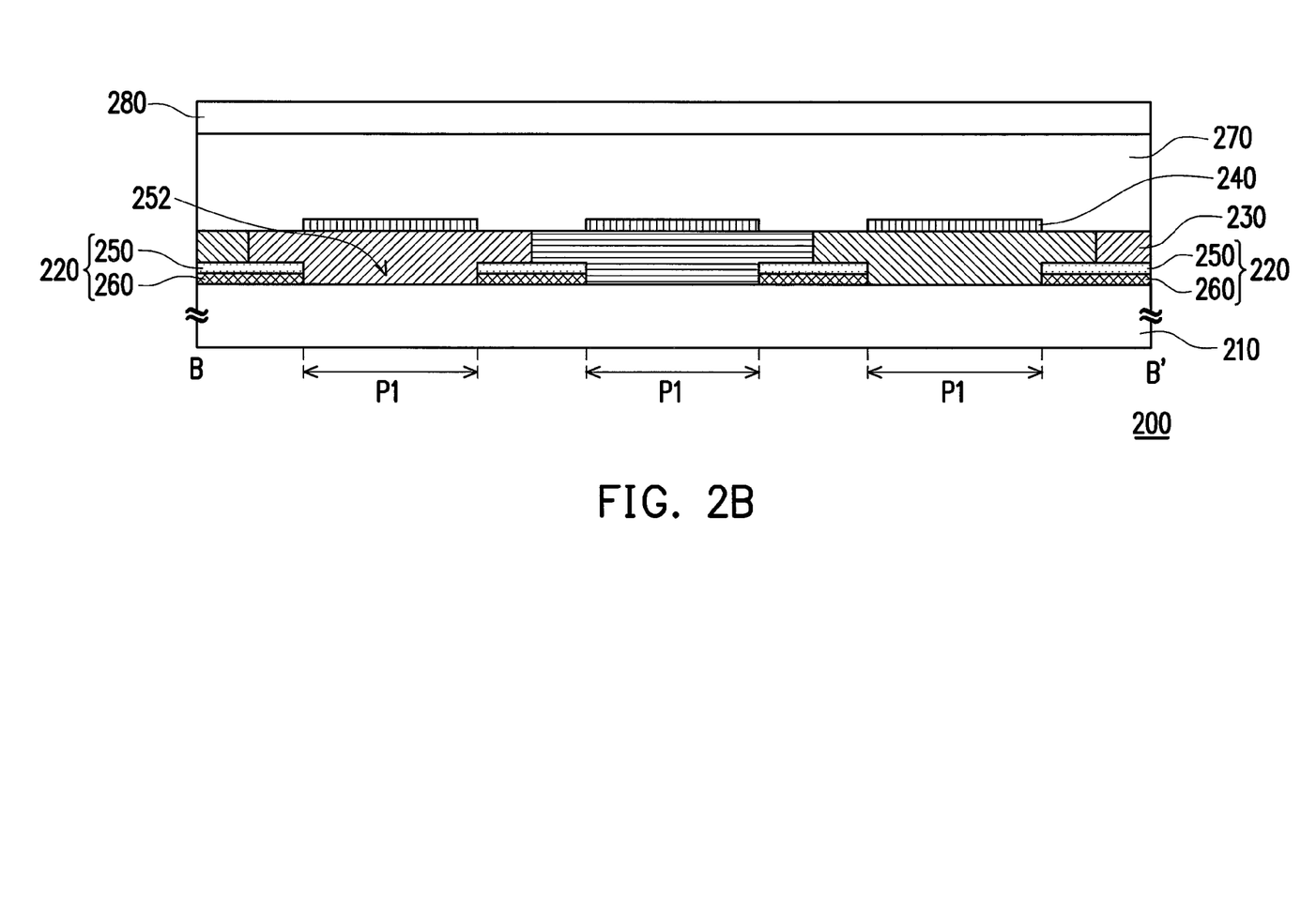
FIG. 2B illustrates a cross-sectional view of the touch sensing color filter along the line BB' in FIG. 2A.

FIG. 2A illustrates a top view of a touch sensing color filter according to the first embodiment of the present invention, and FIG. 2B illustrates a cross-sectional view of the touch sensing color filter along the line BB' in FIG. 2A. For clarity, FIG. 2A mainly illustrates a structure of a sensing electrode, and the layers thereon, such as a third dielectric layer and a common electrode layer, are not shown. FIG. 2B illustrates the arrangement of a substrate and each layer in detail.

In this embodiment, a touch sensing color filter 200 comprises a substrate 210, a black matrix 220, a color filter layer 230, and a second sensing electrode layer 240, wherein a connection between each element of the touch sensing color filter 200 is shown in FIGS. 2A and 2B.

The connection between each element of the touch sensing color filter 200 is described in detail as follows.

In this embodiment, a material of the substrate 210 comprises an inorganic transparent material (e.g. glass, quartz, or other materials), an organic transparent material (e.g. polyolefne, polythiourea, polyalcohols, polyester, rubber, a thermoplastic polymer, a thermosetting polymer, polyarylene, polymethylmethacrylate, polycarbonate, other materials, derivatives thereof, or a combination thereof), an inorganic opaque material (e.g. silicon, ceramics, other materials, or a combination thereof), or a combination thereof. The substrate 210 serves as a base in the touch sensing color filter 200. Glass, one of the inorganic transparent materials, is taken as an example in this embodiment, but the present invention is not limited thereto.

In addition, the black matrix 220 is disposed on the substrate 210 to define a plurality of sub-pixel areas P1. In this embodiment, the black matrix 220 comprises a first sensing electrode layer 250 having a plurality of openings 252 corresponding to the sub-pixel areas P1. A material of the first sensing electrode layer 250 is an opaque metal, such as chromium, molybdenum, aluminum, and titanium. To achieve better display quality in a display panel using the touch sensing color filter 200, the black matrix 220 further comprises an anti-reflective layer 260. The anti-reflective layer 260 is disposed between the first sensing electrode layer 250 and the substrate 210. If the first sensing electrode layer 250 is formed of chromium, a material of the anti-reflective layer 260 is, for example, chromium oxynitride (CrOxNy) or chromium oxide (CrOx), but the present invention is not limited thereto. In other embodiments, if the first sensing electrode layer 250 is formed of the aforesaid metals, the anti-reflective layer 260 is generally a black resin layer, but the present invention is not limited thereto. The black resin layer overlaps the first sensing electrode layer 250, and may be disposed above or below the first sensing electrode layer 250.

In addition, the color filter layer 230 of the touch sensing color filter 200 comprises a plurality of color filter units 232, wherein the color filter units 232 are respectively disposed in the sub-pixel areas P1. A color of the color filter units 232 is, for example, red, green, blue, or a combination of the above. In this embodiment, red, green, and blue are taken as an example, but the present invention is not limited thereto.

In this embodiment, the second sensing electrode layer 240 is disposed on the substrate 210 and comprises a plurality of sub patterns 242 corresponding to the sub-pixel areas P1 respectively. To be more specific, the sub patterns 242 of the second sensing electrode layer 240 are respectively disposed on the color filter units 232 of the color filter layer 230, as shown in FIG. 2B. Moreover, a material of the second sensing electrode layer 240 is a transparent conductor, such as indium tin oxide (ITO), indium zinc oxide (IZO), indium tin zinc oxide (ITZO), hafnium oxide, zinc oxide, aluminum oxide, aluminum tin oxide (ATO), aluminum zinc oxide (AZO), cadmium tin oxide (CTO), cadmium zinc oxide (CZO), or a combination of the above, but the present invention is not limited thereto.

It is noted that, in this embodiment, the sub patterns 242 are serially connected to form the X electrode 110, and the black matrix 220 is, for example, the Y electrode 120. In other words, the second sensing electrode layer 240 and the first sensing electrode layer 250 constitute a plurality of the sensing blocks 100, as shown in FIGS. 1 and 2A.

In addition, the touch sensing color filter 200 further comprises a third dielectric layer 270. The third dielectric layer 270 covers the black matrix 220, the color filter layer 230, and the second sensing electrode layer 240. The third dielectric layer 270 is, for example, a passivation layer or a planar layer. A material of the third dielectric layer 270 is an organic material, an inorganic material, or a combination of the above. The organic material is, for example, photoresist, enzocyclobutane (BCB), cycloolefin, polyimide, polyamide, polyester, polyalcohols, polyethylene, polyphenylene, resin, polyether, polyketone, other materials, or a combination of the above. The inorganic material is, for example, silicon oxide, silicon nitride, silicon oxynitride, other suitable materials, or a combination of the above, but the present invention is not limited thereto.

In this embodiment, the touch sensing color filter 200 further comprises a common electrode layer 280. The common electrode layer 280 is disposed on the third dielectric layer 270. A material of the common electrode layer 280 is, for example, indium tin oxide (ITO), indium zinc oxide (IZO), indium tin zinc oxide (ITZO), hafnium oxide, zinc oxide, aluminum oxide, aluminum tin oxide (ATO), aluminum zinc oxide (AZO), cadmium tin oxide (CTO), cadmium zinc oxide (CZO), or a combination of the above, but the present invention is not limited thereto.

It is noted that the first sensing electrode layer 250 and the second sensing electrode layer 240 are in different layers. The sub patterns 242 of the second sensing electrode layer 240 respectively correspond to the openings 252 of the first sensing electrode layer 250, and the opening 252 respectively correspond to the sub-pixel areas P1. Hence, by a proper wiring method, one sub pattern 242 may technically serve as one sensing unit. In other words, such an arrangement is adapted for greatly improving the touch sensing resolution and touch sensing sensitivity of a touch sensing display panel using the touch sensing color filter 200.

Further, referring to FIGS. 2A and 2B, a fabricating method of the touch sensing color filter 200 is described as follows. First, the substrate 210 is provided, wherein a material of the substrate 210 has been described in the above, and therefore the description thereof is referred to previous description.

Next, the black matrix 220 is formed on the substrate 210 to define a plurality of sub-pixel areas P1, as shown in FIG. 2B. To be more specific, a method for forming the black matrix 220 comprises forming the first sensing electrode layer 250 and forming a plurality of openings 252 corresponding to the sub-pixel areas P1 in the first sensing electrode layer 250. During fabrication, a first electrode material layer (not shown) may be formed all over the substrate 210, wherein the first electrode material layer may be formed by a sputtering process, an evaporation process, a metal organic chemical vapor deposition (MOCVD) process, or other suitable processes. The above is one of the examples, and the present invention is not limited thereto. Next, a conventional photolithography and etching process (PEP) is used to pattern the first electrode material layer, so as to form the first sensing electrode layer 250 having the openings 252 corresponding to the sub-pixel areas P1. The above method is simply one of the examples, and the present invention is not limited thereto. Other suitable methods, such as screen printing, inkjet, laser ablation, or a combination thereof, may also be used to form the first sensing electrode layer 250.

In other embodiments, when the first sensing electrode layer 250 is formed of molybdenum, aluminum, or titanium, a process of forming the black matrix 220 may further comprises forming a black resin layer (not shown), besides forming the first sensing electrode layer 250, wherein the black resin layer overlaps the first sensing electrode layer 250. To be more specific, in this embodiment, the black resin layer may be formed on the substrate 210 first. Then, the first sensing electrode layer 250 is formed on the black resin layer to overlap the black resin layer, or the black resin layer is formed on the first sensing electrode layer 250 after the first sensing electrode layer 250 is formed. It is noted that the patterns of the black resin layer should be the same as the patterns of the first sensing electrode layer 250. In addition, a photolithography process, a printing process, an inkjet process, or a coating process is, for example, used for forming the black resin layer under the first sensing electrode layer 250.

It is noted that, to achieve better display quality in a display panel using the touch sensing color filter 200, the black matrix 220 may further comprise an anti-reflective layer 260. Specifically, in this embodiment, when the first sensing electrode layer 250 is formed of chromium, the process of forming the black matrix 220 further comprises forming the anti-reflective layer 260 between the first sensing electrode layer 250 and the substrate 210. Moreover, a method for forming the anti-reflective layer 260 is, for example, to form an anti-reflective material layer (not shown) first. Then, a photolithography and etching process (PEP) is used to pattern the anti-reflective material layer, so as to form the anti-reflective layer 260 on the substrate 210, as shown in FIG. 2B. It is noted that a material of the anti-reflective layer 260 is, for example, CrOxNy or CrOx.

In other embodiments, when the first sensing electrode layer 250 is, for example, formed of molybdenum, aluminum, or titanium, the anti-reflective layer 260 may be the black resin layer.

Then, a plurality of color filter units 232 is formed in the sub-pixel areas P1, wherein a photolithography process, a printing process, an inkjet process, or a coating process is, for example, used for forming a color filter material in the sub-pixel areas P1 so as to form the color filter units 232.

Thereafter, the second sensing electrode layer 240 is formed on the substrate 210, wherein the second sensing electrode layer 240 comprises a plurality of sub patterns 242. The sub patterns 242 respectively correspond to the sub-pixel areas P1. To be more specific, a method for forming the second sensing electrode layer 240 having the sub patterns 242 is to form a second electrode material layer (not shown) all over the substrate 210 after the aforesaid processes are completed. Next, a photolithography and etching process is used to pattern the second electrode material layer so as to form the second sensing electrode layer 240 having the sub patterns 242. Certainly, the above method is simply one of the examples, and the present invention is not limited thereto. Other suitable methods, such as screen printing, inkjet, laser ablation, or a combination thereof, may also be used to form the second sensing electrode layer 240 having the sub patterns 242.

Then, the third dielectric layer 270 is formed on the substrate 210 after the aforesaid processes are completed, wherein the third dielectric layer 270 covers the black matrix 220, the color filter units 232, and the second sensing electrode layer 240. Specifically, a method for forming the third dielectric layer 270 is, for example, chemical vapor deposition or other suitable methods, such as screen printing, coating, inkjet, or energy source processing.

Thereafter, the common electrode layer 280 is formed on the third dielectric layer 270 after the aforesaid processes are completed. Specifically, the common electrode layer 280 is, for example, formed by using a sputtering process or an evaporation process. Certainly, the aforesaid method is simply one of the examples. Other suitable methods and processes, such as screen printing, coating, inkjet, or energy source processing, may also be used to form the common electrode layer 280. A material of the common electrode layer 280 has been described as above. Hence, the description thereof is omitted hereafter. Thereby, the fabrication of the touch sensing color filter 200 is completed.

To conclude, a fabricating method of the touch sensing color filter 200 in this embodiment is summarized as forming the black matrix 220 on the substrate 210, forming the color filter units 232 on the black matrix 220, and forming the sub patterns 242 of the second sensing electrode layer 240 on the color filter units 232 after the color filter units 232 are formed. Descriptions of the fabricating method have been detailed in the above.

To be specific, the color filter units 232 of the touch sensing color filter 200 in this embodiment are disposed between the first sensing electrode layer 250 and the second sensing electrode layer 240, and serve as an insulation layer between the first sensing electrode layer 250 and the second sensing electrode layer 240. Consequently, the conventional fabricating method is simplified. In addition, the first sensing electrode layer 250 and the second sensing electrode layer 240 are designed to be different layers, and the sub patterns 242 of the second sensing electrode layer 240 respectively correspond to the openings 252, which correspond to the sub-pixel areas P1, of the first sensing electrode layer 250. Hence, technically, each sub pattern 252 in the touch sensing color filter 200 may be designed to be one sensing unit. In other words, one sub pixel serves as one sensing unit. Hence, the touch sensing resolution and touch sensing sensitivity of the touch sensing color filter 200 are improved. In other embodiments, the sensing unit may be formed by a group of sub patterns 252 according to the user's requirements, but the present invention is not limited thereto.

Second Embodiment

Figure 3A:
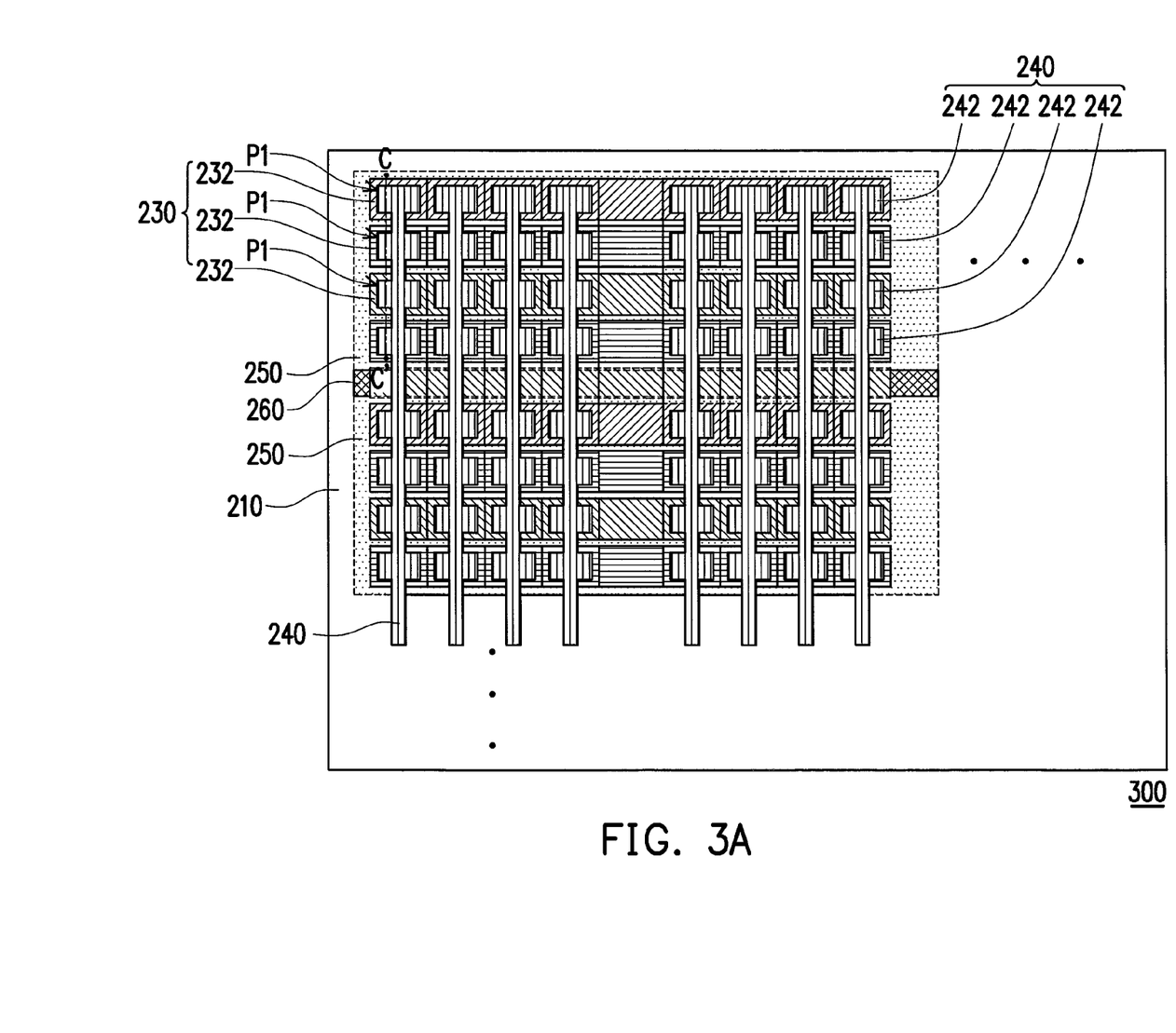
FIG. 3A illustrates a top view of a touch sensing color filter according to the second embodiment of the present invention.
Figure 3B:
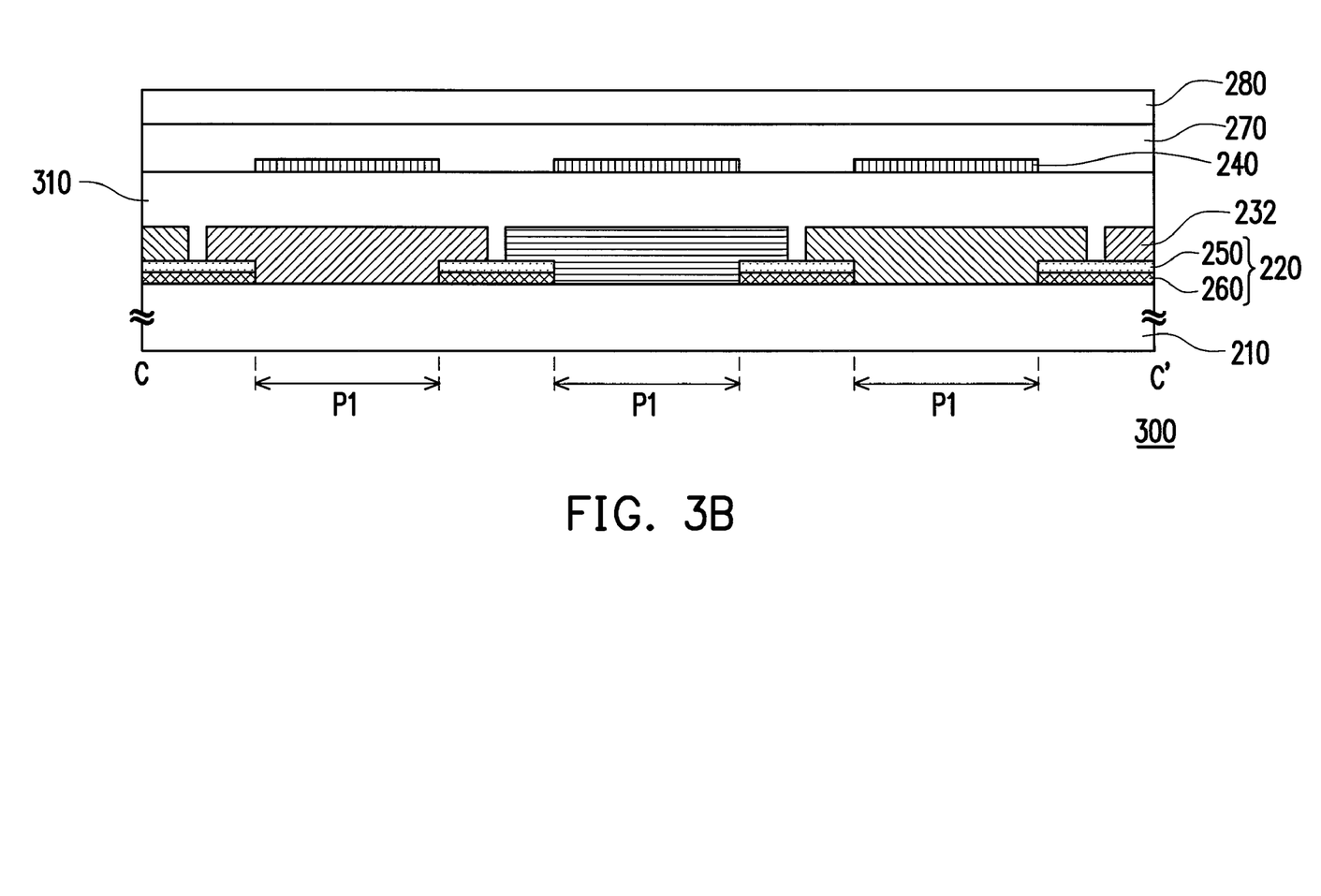
FIG. 3B illustrates a cross-sectional view of the touch sensing color filter along the line CC' in FIG. 3A.

FIG. 3A illustrates a top view of a touch sensing color filter according to the second embodiment of the present invention, and FIG. 3B illustrates a cross-sectional view of the touch sensing color filter along the line CC' in FIG. 3A. For clarity, FIG. 3A mainly illustrates a structure of a sensing electrode, and the layers thereon, such as a first dielectric layer, a third dielectric layer, and a common electrode layer, are omitted. FIG. 3B illustrates the arrangement of a substrate and each layer in detail.

Referring to FIGS. 2A, 2B, 3A, and 3B, a structure of a touch sensing color filter 300 is similar to that of the touch sensing color filter 200, and the redundant descriptions are not repeated hereafter. The difference lies in that the touch sensing color filter 300 further comprises a first dielectric layer 310, wherein the first dielectric layer 310 covers the color filter layer 230 and the black matrix 220, and the second sensing electrode layer 240 is disposed on the first dielectric layer 310, as shown in FIG. 3B.

To be more specific, different from the touch sensing color filter 200 which uses the color filter layer 230 as an insulation layer between the first sensing electrode layer 250 and the second sensing electrode layer 240 in the aforesaid embodiment, the touch sensing color filter 300 in this embodiment uses the first dielectric layer 310 and the color filter layer 230 as an insulation layer between the first sensing electrode layer 250 and the second sensing electrode layer 240. Furthermore, because the first dielectric layer 310 covers the color filter layer 230 and the black matrix 220, the first dielectric layer 310 protects the color filter layer 230 from being contaminated or damaged during fabrication. In addition, the first dielectric layer 310 also prevents the short circuit between the second sensing electrode layer 240 and the first sensing electrode layer 250 caused by a process error.

The structure of the touch sensing color filter 300 is similar to that of the touch sensing color filter 200, and the difference lies in that the touch sensing color filter 300 further comprises the first dielectric layer 310. In other words, the fabricating method of the touch sensing color filter 200 may also be applied in fabricating the touch sensing color filter 300. The descriptions of the fabricating method are therefore not repeated hereafter. It is noted that, after the black matrix 220 and the color filter units 232 are respectively formed on the substrate 210, the first dielectric layer 310 is formed on the substrate 210 to cover the color filter units 232 and the black matrix 220, wherein a method for forming the first dielectric layer 310 is, for example, chemical vapor deposition or other suitable methods, such as screen printing, coating, inkjet, or energy source processing. Then, as described in the previous embodiment, the second sensing electrode layer 240 is formed on the first dielectric layer 310. Thereafter, the third dielectric layer 270 is formed on the second sensing electrode layer 240 and the first dielectric layer 310, and the common electrode layer 280 is formed on the third dielectric layer 270. Thereby, the fabrication of the touch sensing color filter 300 is completed.

Besides the advantages of the touch sensing color filter 200, the touch sensing color filter 300 in this embodiment further has the first dielectric layer 310 to protect the color filter layer 230 from being contaminated or damaged. In addition, the first dielectric layer 310 can prevent the short circuit between the second sensing electrode layer 240 and the first sensing electrode layer 250 caused by a process error.

Third Embodiment

Figure 4A:
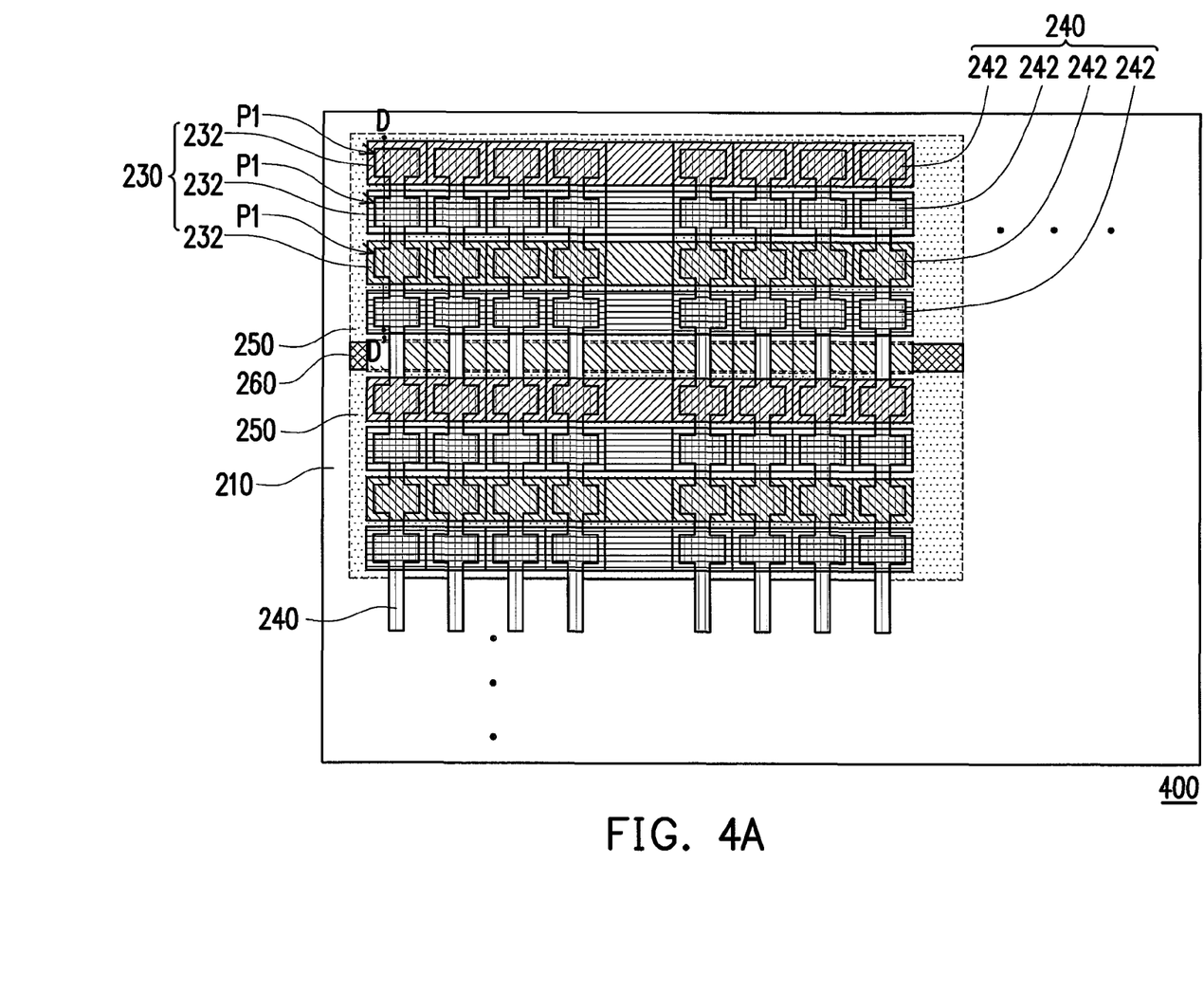
FIG. 4A illustrates a top view of a touch sensing color filter according to the third embodiment of the present invention.
Figure 4B:
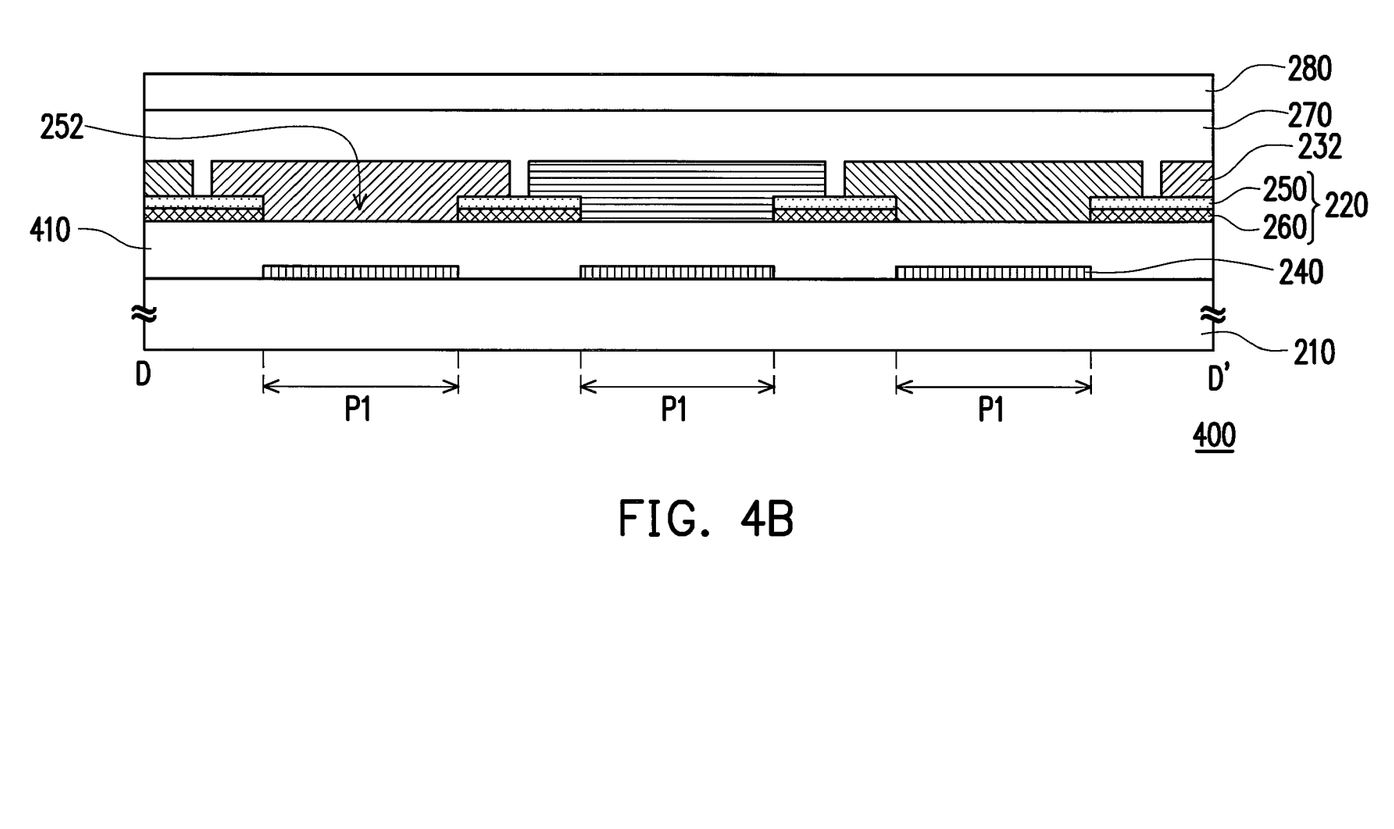
FIG. 4B illustrates a cross-sectional view of the touch sensing color filter along the line DD' in FIG. 4A.

FIG. 4A illustrates a top view of a touch sensing color filter according to the third embodiment of the present invention, and FIG. 4B illustrates a cross-sectional view of the touch sensing color filter along the line DD' in FIG. 4A. For clarity, FIG. 4A mainly illustrates a structure of a sensing electrode, and the layers thereon, such as a second dielectric layer, a third dielectric layer, and a common electrode layer, are omitted. FIG. 4B illustrates the arrangement of a substrate and each layer in detail.

Referring to FIGS. 4A and 4B, a touch sensing color filter 400 in this embodiment is formed by varying a sequence of the layers of the touch sensing color filter 200. Accordingly, the same elements are indicated by the same reference numbers. Moreover, the touch sensing color filter 400 further comprises a second dielectric layer 410. The second dielectric layer 410 is disposed between the black matrix 220 and the substrate 210, and the second sensing electrode layer 240 is disposed between the second dielectric layer 250 and the substrate 210.

A connection between each element of the touch sensing color filter 400 is described in detail as follows.

In the touch sensing color filer 400, the second sensing electrode layer 240 is disposed on the substrate 210. The second dielectric layer 410 is disposed on the second sensing electrode layer 240, so that the second sensing electrode layer 240 is arranged between the second dielectric layer 410 and the substrate 210. Furthermore, the black matrix 220 is disposed on the second dielectric layer 410 to define a plurality of sub-pixel areas P1. The black matrix 220 comprises the first sensing electrode layer 250 which has a plurality of openings 252 corresponding to the sub-pixel areas P1. The color filter layer 230 comprises a plurality of color filter units 232 disposed in the sub-pixel areas P1 respectively. The third dielectric layer 270 covers the black matrix 220 and the color filter layer 230. The common electrode layer 280 is disposed on the third dielectric layer 270.

It is noted that the materials of the substrate 210, the black matrix 220, the color filter layer 230, the first sensing electrode layer 250, the second sensing electrode layer 240, the third dielectric layer 270, and the common electrode layer 280 have been described in the first embodiment. Hence, the descriptions thereof are not repeated hereafter. A material of the second dielectric layer 410 is an organic material, an inorganic material, or a combination of the above. The organic material is, for example, photoresist, enzocyclobutane (BCB), cycloolefin, polyimide, polyamide, polyester, polyalcohols, polyethylene, polyphenylene, resin, polyether, polyketone, other materials, or a combination of the above. The inorganic material is, for example, silicon oxide, silicon nitride, silicon oxynitride, other suitable materials, or a combination of the above, but the present invention is not limited thereto.

Moreover, different from the touch sensing color filters 200 and 300 which use the color filter layer 230, or the color filter layer 230 and the first dielectric layer 310, as an insulation layer between the first sensing electrode layer 250 and the second sensing electrode layer 240, the touch sensing color filter 400 in this embodiment uses the second dielectric layer 410 as an insulation layer between the first sensing electrode layer 250 and the second sensing electrode layer 240. To be more specific, because the second dielectric layer is directly used as the insulation layer between the first sensing electrode layer and the second sensing electrode layer, a capacitance value between the electrode layers 240 and 250 can be designed to be more precise due to the color filter layer 230. In other words, besides the advantages of the touch sensing color filters 200 and 300, the touch sensing color filter 400 has the advantage that the capacitance value can be easily designed.

Further, referring to FIGS. 4A and 4B, a fabricating method of the touch sensing color filter 400 is described as follows. First, the substrate 210 is provided. Then, the second sensing electrode layer 240 is formed on the substrate 210. Thereafter, the second dielectric layer 410 is formed to cover the second sensing electrode layer, wherein a method for forming the second dielectric layer 410 is, for example, chemical vapor deposition or other suitable methods, such as screen printing, coating, inkjet, or energy source processing. Next, the black matrix 220 and the color filter units 232 are formed on the substrate 210. Then, as the method described in the previous embodiment, the third dielectric layer 270 is formed on the black matrix 220 and the color filter units 232, and the common electrode layer 280 is formed on the third dielectric layer 270. Thereby, the fabrication of the touch sensing color filter 400 is completed. Herein, the methods for forming the aforesaid layers have been described in the previous embodiment. Hence, the descriptions thereof are omitted hereafter.

Fourth Embodiment

Figure 5:
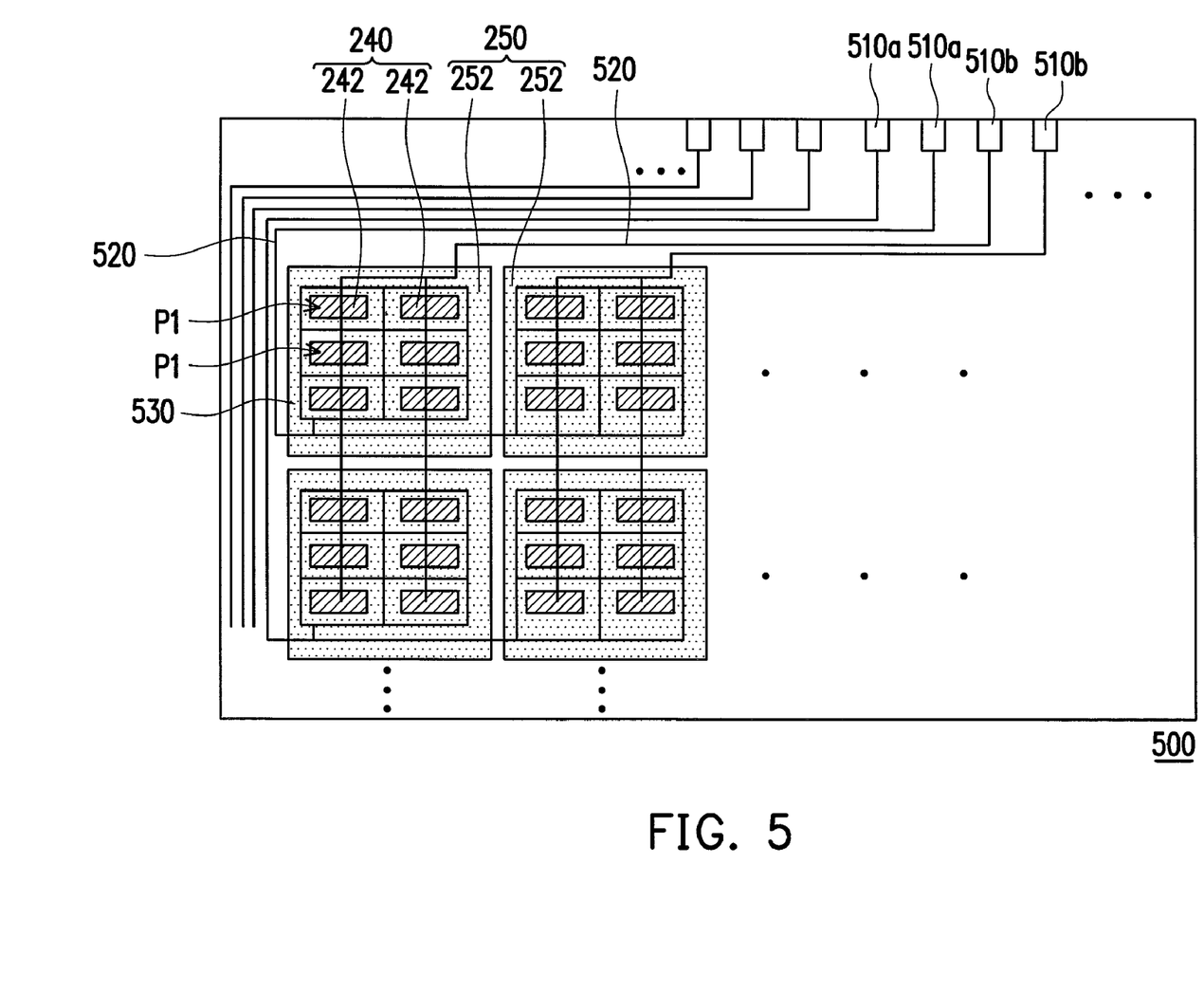
FIG. 5 illustrates a top view of a touch sensing color filter according to the fourth embodiment of the present invention.

FIG. 5 illustrates a top view of a portion of a touch sensing color filter according to the fourth embodiment of the present invention. For simplicity, FIG. 5 only illustrates a series of a sensing blocks and a corresponding bonding pad electrically connected with the sensing blocks. Referring to FIG. 5, a touch sensing color filter 500 in this embodiment may be any one of aforesaid touch sensing color filters 200, 300, and 400. In addition, the touch sensing color filter 500 further comprises a plurality of bonding pads 510a and 510b, and a plurality of conductive lines 520. The bonding pads 510a are electrically connected with the first sensing electrode layer 250 by the conductive lines 520, and the bonding pads 510b are electrically connected with the second sensing electrode layer 240 by the conductive lines 520.

In this embodiment, the first sensing electrode layer 250 is includes a plurality of X electrodes. The first sensing electrode layer 250 comprises a plurality of individual sensing blocks 530, wherein each sensing block 530 corresponds to a plurality of sub-pixel areas P1, and each series of sensing blocks 530 is electrically connected with the bonding pad 510a by the conductive line 520. Further, the second sensing electrode layer 240 includes a plurality of Y electrodes. The sub patterns 242 of the second sensing electrode layer 240 are divided into a plurality of groups corresponding to the sensing blocks 530. The sub patterns 242 of each group in corresponding sensing blocks 530 are serially connected with one another by the conductive line 520, which is electrically connected with the bonding pad 510b, as shown in FIG. 5.

Specifically, in a display panel using the touch sensing color filter 500, an equivalent capacitance value between the sensing block 530 and the corresponding sub patterns 242 is changed when the user touches the sensing block 530, and a voltage signal or current signal of the change is transmitted to the bonding pads 510b and 510a respectively by the conductive lines 520. Through a circuit design, the touch sensing display panel detects an area the user touches.

It is noted that, in the touch sensing color filter 500 as shown in FIG. 5, each sensing block 530 corresponds to a group of six sub-pixel areas P1 and a group of six sub patterns 242. In other words, in the touch sensing color filter 500 of this embodiment, six sub-pixel areas P1 serve as one sensing unit. In other embodiments, however, each sensing block 530 may correspond to one sub-pixel area P1 which serves as a group. It is to say that, by applying the design of the conductive lines 520 and the patterns between the first sensing electrode layer 250 and the second sensing electrode layer 240, the touch sensing color filter 500 can use one sub-pixel area P1 as one sensing unit. The above design is merely one of the examples. The present invention does not limit the number of the sub-pixel areas P1 to be used as one sensing unit.

The Fifth Embodiment

Figure 6:
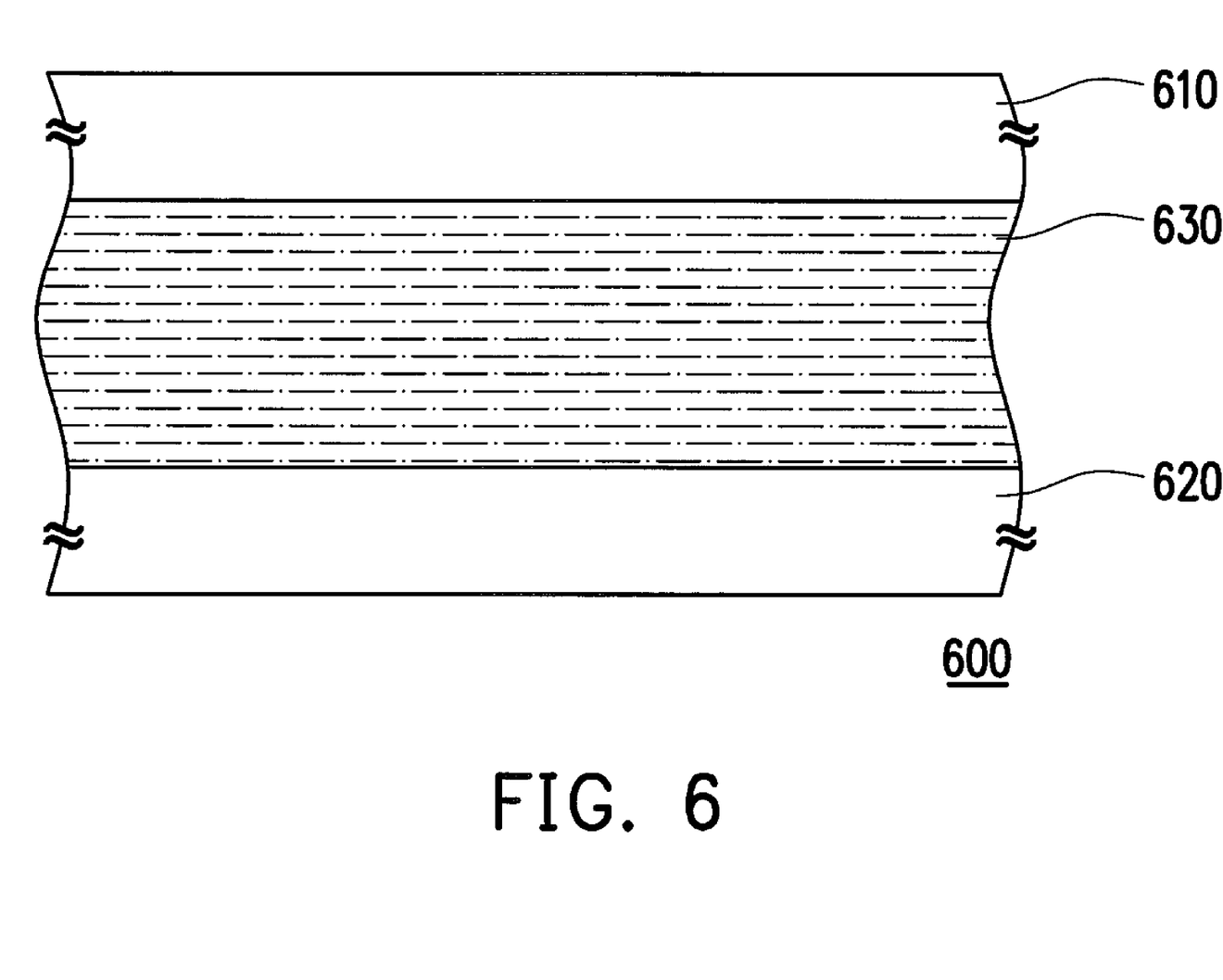
FIG. 6 illustrates a cross-sectional view of a touch sensing color filter according to the fifth embodiment of the present invention.

FIG. 6 illustrates a cross-sectional view of a touch sensing color filter according to the fifth embodiment of the present invention. A touch sensing display panel 600 in this embodiment comprises a color filter 610, a display array substrate 620, and a liquid crystal layer 630. The liquid crystal layer 630 is disposed between the color filter 610 and the display array substrate 620. The liquid crystal layer 630 can be replaced by other display materials, such as organic light emitting layer or electrophoretic layer, but not limited thereto, which is well known by a person skilled in the art.

To be more specific, the color filter 610 comprises one of the touch sensing color filters 200, 300, 400, and 500 described in the above embodiments. Because the color filter 610 has the advantages of higher touch sensing resolution, better sensitivity, and simpler fabricating processes, the touch sensing display panel 600 has the same advantages as well.

Furthermore, the display array substrate 620 is, for example, an active device array substrate, and the display array substrate 620 has an active layer (not shown) formed thereon, which comprises a plurality of scan lines (not shown), a plurality of data lines (not shown), a plurality of thin film transistors (not shown), and a plurality of pixel electrodes (not shown), wherein the scan lines and the data lines are alternately arranged, the thin film transistors are electrically connected with corresponding scan lines and data lines, and the pixel electrodes are electrically connected with corresponding thin film transistors. Certainly, the display array substrate 620 may vary when the display panel 600 has different display modes, such as a transmissive display panel, a transflective display panel, a reflective display panel, a color filter on array display panel, a vertical alignment (VA) display panel, an in plane switch (IPS) display panel, a multi-domain vertical alignment (MVA) display panel, a twist nematic (TN) display panel, a super twist nematic (STN) display panel, a patterned-silt vertical alignment (PVA) display panel, a super patterned-silt vertical alignment (S-PVA) display panel, an advance super view (ASV) display panel, a fringe field switching (FFS) display panel, a continuous pinwheel alignment (CPA) display panel, an axially symmetric aligned micro-cell mode (ASM) display panel, an optical compensation banded (OCB) display panel, a super in plane switching (S-IPS) display panel, an advanced super in plane switching (AS-IPS) display panel, a ultra-fringe field switching (UFFS) display panel, a PSA display panel, a dual-view display panel, a triple-view display panel, a three-dimensional display panel, other types of display panels, or a combination of the above.

In addition, the types of the liquid crystal molecules in the liquid crystal layer 630 may vary according to the display panels. A material of the liquid crystal molecules is known to persons having ordinary knowledge in this field. Hence, the descriptions thereof are omitted hereafter.

In conclusion, the touch sensing color filer of the present invention has at least the following advantages. First, the color filter units are used as the insulation layer between the first sensing electrode layer and the second sensing electrode layer to simplify the fabricating process and increase process yield. Alternately, a dielectric layer covering the color filter layer is used as the insulation layer between the first sensing electrode layer and the second sensing electrode layer, so as to prevent the color filter layer from being contaminated and prevent the first sensing electrode layer and the second sensing electrode layer from being electrically connected with each other. Otherwise, the positions of the first sensing electrode layer and the second sensing electrode layer may be switched, wherein the color filter layer is disposed on the first sensing electrode layer, and a dielectric layer is disposed between the first and the second sensing electrode layers, so that the capacitance value between the first and the second sensing electrode layers can be easily designed. Moreover, because the first sensing electrode layer and the second sensing electrode layer of the touch sensing color filter are designed to be different layers, the touch sensing resolution in a limited touch area can be improved, for example, one pixel may be designed to correspond to one sensing unit. In addition, operation sensitivity and fabrication reliability can be enhanced if the touch sensing color filter of the present invention is applied in a display panel.

Although the present invention has been disclosed by the above embodiments, they are not intended to limit the present invention. Anybody with ordinary knowledge in the art may make some modifications and alterations without departing from the spirit and scope of the present invention. Therefore, the protection range of the present invention falls in the appended claims.

What is claimed is:

1. A touch sensing color filter, comprising:
    a substrate;
    a black matrix disposed on the substrate to define a plurality of sub-pixel areas, the black matrix comprising a first sensing electrode layer having a plurality of openings corresponding to the sub-pixel areas;
    a color filter layer, comprising a plurality of color filter units respectively disposed in the sub-pixel areas; and
    a second sensing electrode layer disposed on the substrate and comprising a plurality of sub patterns corresponding to the sub-pixel areas respectively.

2. The touch sensing color filter as claimed in claim 1, wherein the sub patterns of the second sensing electrode layer are respectively disposed on the color filter units of the color filter layer.

3. The touch sensing color filter as claimed in claim 2, further comprising a first dielectric layer covering the color filter layer and the black matrix, and the second sensing electrode layer being disposed on the first dielectric layer.

4. The touch sensing color filter as claimed in claim 1, further comprising a second dielectric layer disposed between the black matrix and the substrate, and the second sensing electrode layer being disposed between the second dielectric layer and the substrate.

5. The touch sensing color filter as claimed in claim 1, further comprising a third dielectric layer covering the black matrix, the color filter layer, and the second sensing electrode layer.

6. The touch sensing color filter as claimed in claim 5, further comprising a common electrode layer disposed on the third dielectric layer.

7. The touch sensing color filter as claimed in claim 1, wherein a material of the first sensing electrode layer is an opaque metal.

8. The touch sensing color filter as claimed in claim 1, wherein the black matrix further comprises a black resin layer overlapping the first sensing electrode layer.

9. The touch sensing color filter as claimed in claim 1, wherein a material of the second sensing electrode layer is a transparent conductor.

10. The touch sensing color filter as claimed in claim 1, wherein the black matrix further comprises an anti-reflective layer disposed between the first sensing electrode layer and the substrate.

11. The touch sensing color filter as claimed in claim 1, wherein the first sensing electrode layer is an X electrode comprising a plurality of individual sensing blocks, wherein each sensing block corresponds to a plurality of sub-pixel areas.

12. The touch sensing color filter as claimed in claim 11, wherein the second sensing electrode layer is a Y electrode, and the sub patterns of the second sensing electrode layer are divided into a plurality of groups corresponding to the sensing blocks and the sub patterns of each group are serially connected with one another.

13. A fabricating method of a touch sensing color filter, comprising:
    providing a substrate;
    forming a black matrix including a first sensing electrode layer on the substrate to define a plurality of sub-pixel areas, wherein the black matrix including the first sensing electrode layer has a plurality of openings corresponding to the sub-pixel areas in the first sensing electrode layer;
    forming a plurality of color filter units in the sub-pixel areas; and
    forming a second sensing electrode layer on the substrate, wherein the second sensing electrode layer comprises a plurality of sub patterns corresponding to the sub-pixel areas respectively.

14. The fabricating method as claimed in claim 13, wherein the black matrix is formed on the substrate first, and the sub patterns of the second sensing electrode layer are formed on the color filter units after the color filter units are formed.

15. The fabricating method as claimed in claim 14, further comprising forming a first dielectric layer to cover the color filter units and the black matrix after the black matrix and the color filter units are formed.

16. The fabricating method as claimed in claim 13, further comprising forming a second dielectric layer to cover the second sensing electrode layer after the second sensing electrode layer is formed on the substrate.

17. The fabricating method as claimed in claim 13, further comprising forming a third dielectric layer to cover the black matrix, the color filter units, and the second sensing electrode layer.

18. The fabricating method as claimed in claim 17, further comprising forming a common electrode layer on the third dielectric layer.

19. The fabricating method as claimed in claim 13, wherein a process of forming the black matrix further comprises forming a black resin layer overlapping the first sensing electrode layer.

20. The fabricating method as claimed in claim 13, wherein the process of forming the black matrix further comprises forming an anti-reflective layer between the first sensing electrode layer and the substrate.

21. A touch sensing display panel, comprising:
 a color filter, comprising:
  a black matrix comprising a first sensing electrode layer disposed on the substrate to define a plurality of sub-pixel areas, and the black matrix comprising the first sensing electrode layer having a plurality of openings corresponding to the sub-pixel areas;
  a color filter layer, comprising a plurality of color filter units respectively disposed in the sub-pixel areas; and
  a second sensing electrode layer disposed on the substrate and comprising a plurality of sub patterns corresponding to the sub-pixel areas respectively; and
 a display array substrate; and
 a liquid crystal layer disposed between the color filter and the display array substrate.

* * * * *